United States Patent

James

(10) Patent No.: US 12,119,747 B2
(45) Date of Patent: Oct. 15, 2024

(54) DC/DC CONVERTER WITH PARALLEL BUCK-BOOST MODULES FOR ELECTROFUSION WELDING

(71) Applicant: ADVANCE TECHNICAL SYSTEMS LIMITED, West Yorkshire (GB)

(72) Inventor: Pete James, Wellesbourne (GB)

(73) Assignee: Advance Technical Systems Limited (GB)

( * ) Notice: Subject to any disclaimer, the term of this patent is extended or adjusted under 35 U.S.C. 154(b) by 31 days.

(21) Appl. No.: 17/928,154

(22) PCT Filed: Jun. 3, 2021

(86) PCT No.: PCT/GB2021/051382
§ 371 (c)(1),
(2) Date: Nov. 28, 2022

(87) PCT Pub. No.: WO2021/245419
PCT Pub. Date: Dec. 9, 2021

(65) Prior Publication Data
US 2023/0216412 A1  Jul. 6, 2023

(30) Foreign Application Priority Data
Jun. 4, 2020 (GB) .................................... 2008428

(51) Int. Cl.
*H02M 3/158* (2006.01)
*B29C 65/34* (2006.01)
*H02M 3/335* (2006.01)

(52) U.S. Cl.
CPC ........... *H02M 3/1584* (2013.01); *B29C 65/34* (2013.01); *H02M 3/3353* (2013.01)

(58) Field of Classification Search
CPC .................................................. H02M 3/1584
(Continued)

(56) References Cited

U.S. PATENT DOCUMENTS

| 5,466,916 A | * | 11/1995 | Iguchi | ............... B29C 66/91443 |
| | | | | 285/21.2 |
| 5,908,575 A | * | 6/1999 | Smith | ...................... B29C 66/71 |
| | | | | 219/661 |

(Continued)

FOREIGN PATENT DOCUMENTS

| CN | 207382193 U | | 5/2018 | | |
| EP | 1266745 A2 | * | 12/2002 | ........... | B29C 65/342 |
| EP | 2193954 A1 | * | 6/2010 | ................ | B60L 1/00 |

*Primary Examiner* — Joseph Chang
(74) *Attorney, Agent, or Firm* — Burns & Levinson LLP; Daniel J. McGrath (57) ABSTRACT

A power convertor configured to output power to an electrofusion welding coupler for performing electrofusion welding. The power convertor comprises an array of connected DC to DC power convertor circuits. In use, the array of connected DC to DC power convertor circuits is configured to receive, at a first interface, power at a first voltage level from a battery and output power, at a second interface, at a second voltage level to provide power to electrofusion welding cable means. The DC to DC power convertors are arranged in a buck-boost configuration which can operate in a boost mode in which the first voltage level is less than the second voltage level and in a buck mode in which the first voltage level is greater than the second voltage level.

12 Claims, 7 Drawing Sheets

(58) Field of Classification Search
USPC .......................................................... 307/113
See application file for complete search history.

(56) References Cited

U.S. PATENT DOCUMENTS

| | | |
|---|---|---|
| 2005/0286277 A1 | 12/2005 | Krein |
| 2010/0007319 A1* | 1/2010 | Manabe .............. H02M 3/1582 |
| | | 323/285 |
| 2012/0134180 A1* | 5/2012 | Watanabe ........... H02M 3/1582 |
| | | 363/17 |
| 2012/0169126 A1 | 7/2012 | Totterman et al. |
| 2019/0245446 A1 | 8/2019 | Jojima et al. |
| 2021/0402710 A1* | 12/2021 | Cappon ................... B29C 66/95 |

* cited by examiner

BUCK MODE (Charging)

Fig 5a

BOOST MODE (Charging)

DC/DC CONVERTER WITH PARALLEL BUCK-BOOST MODULES FOR ELECTROFUSION WELDING

CROSS-REFERENCE TO RELATED APPLICATIONS

This application is a U.S. national stage application under 35 U.S.C. 371 of co-pending International Application No. PCT/GB2021/051382, filed on Jun. 3, 2021, and entitled "DC/DC Converter with Parallel Buck-Boost Modules for Electrofusion Welding", which claims priority to United Kingdom Application No. 2008428.1, filed Jun. 4, 2020, and entitled "Power convertor", the contents of each of which are incorporated herein by reference in their entirety for all purposes.

TECHNICAL FIELD

The present invention relates to power convertors configured for use with electrofusion welding systems.

BACKGROUND

For certain applications requiring electrical power, it is important, for correct operation, for the electrical power supplied to provide a consistent and uniform output voltage that can be accurately controlled.

Whilst such applications are commonly low-current output applications, for example computing applications, communications applications, sensor applications and so on, certain higher-current applications also require this type of voltage output from a power source for correct operation. An example of this is electrofusion welding.

Electrofusion welding is a well-known technique for joining sections of plastic piping. The technique is used in many settings, including, for example, assembling and repairing pipe work for gas, water, electrical and communication infrastructure.

Sections of pipe to be joined are typically inserted in a weld coupler. The weld coupler is a short tubular conduit, dimensioned to receive a pipe section at either end. Embedded in the weld coupler is a wire heating coil. Via special welding cables, a current is applied to the wire heating coil which melts adjacent regions of the weld coupler and pipe sections. Once the current ceases to be applied, the melted regions of the weld coupler and pipe section cool, and as they do so, they fuse together forming a fluid tight joint.

For reliable joints to be formed, the temperature that the wire heating coil reaches, and the length of time that the wire heating coil is heated for, must be carefully controlled. Moreover, as many different types of pipework may be joined (varying, for example in size, thickness and material), the amount of energy required to heat different wire heating coils is different.

Power supplies that provide the voltage source for electrofusion welding must therefore be capable of reliably providing a precise and consistent output voltage. Conventional power supplies (for example, those used to provide electrical power to equipment in a construction setting) are not typically cable of providing the requisite precise and controlled output voltages. For this reason, electrofusion welding typically requires specialist power units which can precisely control the voltage applied across the wire heating coil and thus the heating that the wire heating coil is subject to.

Such specialist power units are typically powered by an AC power generator (for example a diesel power generator). These specialist power units "filter" the AC power provided by the AC power generator, smoothing, for example, voltage spikes, current surges and unwanted harmonics to generate a controlled variable voltage (typically an AC output voltage) that is consistent enough to allow a controlled and precise heating of the wire heating coil.

Such AC power generators, particularly diesel-powered generators, are large, heavy and difficult to accommodate in confined spaces. Accordingly, it would be desirable to provide an electrofusion welding system which is powered by a battery. However, using a battery as a power source for applications such as electrofusion welding has its own challenges. Whilst batteries may be more portable that a conventional AC power generator, given that electrofusion welding requires high current outputs, batteries will deplete in energy quickly. As a battery depletes in energy, the voltage that it generates across its terminals will drop which makes providing the precise voltage levels necessary for electrofusion welding, more difficult.

It is an aim of embodiments of the invention, to provide a means by which a battery, or similar power source, can be used to generate the type of voltage outputs required to power high-current applications like electrofusion welding, that is those requiring a consistent and uniform output voltage and that can be accurately controlled.

SUMMARY OF THE INVENTION

In accordance with a first aspect of the invention, there is provided a power convertor configured to output power to an electrofusion welding coupler for performing electrofusion welding. The power convertor comprises an array of connected DC to DC power convertor circuits. In use, the array of connected DC to DC power convertor circuits is configured to receive, at a first interface, power at a first voltage level from a battery and output power, at a second interface, at a second voltage level to provide power to electrofusion welding cable means. The DC to DC power convertors are arranged in a buck-boost configuration which can operate in a boost mode in which the first voltage level is less than the second voltage level and in a buck mode in which the first voltage level is greater than the second voltage level.

Optionally, the DC to DC power convertor circuits are connected in parallel.

Optionally, the DC to DC power convertor circuits are connected to a common ground, a common input power line and a common output power line.

Optionally, each DC to DC power convertor comprises a plurality of switches. The plurality of switches of each DC to DC power convertor configurable to operate in accordance with a first switching sequence which configures the DC to DC power convertor, which the plurality of switches comprise, to operate in the buck mode. The plurality of switches of each DC to DC power convertor is also configurable to operate in accordance with a second switching sequence which configures the DC to DC power convertor, which the plurality of switches comprise, to operate in the boost mode.

Optionally, the power convertor further comprises control logic, wherein the plurality of switches of the DC to DC power convertor circuits are controlled by the control logic.

Optionally, the control logic is operable to control the plurality of switches of the DC to DC power convertor circuits to implement a battery charge function in which input charging power is received from the second interface at an input voltage level and output charging power is output for charging the battery at the first interface at an output level.

Optionally, the DC to DC power convertor circuits are configured in a four-switch configuration.

Optionally, each DC to DC power convertor circuit comprises an inductor and four switches, a first pair of the switches connected in series and configured such that, in use, across the first pair of the switches, an input voltage at the first voltage level from the battery is expressed, and a second pair of the switches connected in series and configured such that in use, an output voltage, at the second voltage level, for applying across the electrofusion welding cable means is expressed, wherein an inductor connects the first pair of the switches and the second pair of the switches at a mid-point between the switches of each pair of the switches.

Optionally, the control logic controls the switches to: operate in a buck mode by switching the switches of the first pair of the switches on and off alternately in accordance with a duty cycle, and switching a first switch of the second pair of the switches continuously off and switching a second switch of the second pair of the switches continuously on, wherein the switch that is continuously on is the switch of the second pair of switches that is connected to ground. The control logic further controls the switches to: operate in a boost mode by switching the switches of the second pair of the switches on and off alternately in accordance with a duty cycle, and switching a first switch of the first pair of the switches continuously off and switching a second switch of the first pair of the switches continuously on, wherein the switch that is continuously on is the switch of the first pair of the switches that is connected to ground.

Optionally, the switches comprise field effect transistors.

Optionally, one or more of the DC to DC power convertors of the array of connected DC to DC power convertor circuits are configured to selectively provide output power, at a further interface, at a further voltage level to provide power to further apparatus requiring electrical power.

Optionally, the control logic is operable to selectively switch-off one or more of the DC to DC power convertor circuits.

Optionally, the array of connected DC to DC power convertor circuits comprises at least three DC to DC power convertor circuits.

In accordance with a second aspect of the invention, there is provided an electrofusion welding power supply comprising a battery and a power convertor in accordance with the first aspect of the invention.

Optionally, the electrofusion welding power supply is configured to provide power for electrofusion welding system, said power supply comprising output connections for electrofusion cables connected to the second interface.

In accordance with a third aspect of the invention, there is provided a power convertor. The power convertor comprises an array of connected DC to DC power convertor circuits. In use, the array of connected DC to DC power convertor circuits is configured to receive, at a first interface, power at a first voltage level from a battery and output power, at a second interface, at a second voltage level to provide power to apparatus requiring electrical power. The DC to DC power convertors are arranged in a buck-boost configuration which can operate in a boost mode in which the first voltage level is less than the second voltage level and in a buck mode in which the first voltage level is greater than the second voltage level.

In accordance with certain aspects of the invention, there is provided a power convertor for providing output power from a battery for providing output power to an electrofusion welding coupler for performing electrofusion welding. The power convertor comprises an array of DC to DC power convertor circuits that are arranged in a buck-boost configuration. Conveniently, this configuration means that the output voltage can be controlled to be constant, even if the output voltage of the battery begins at a level that is higher than the required output voltage and then drops to a level that is lower than the required output voltage as the battery voltage depletes as it discharges.

Moreover, because of the symmetrical nature of buck-boost DC to DC power convertor circuits, by simply changing the switching pattern of the switches, the output interface of the power convertor via which, in use, output power is provided, can be used in a battery charging configuration, to receive power which is transferred by the power convertor to the battery to charge the battery.

In certain embodiments, the DC to DC power convertor circuits are arranged in parallel in a multiphase, interleaved configuration. This configuration reduces input and output ripple currents in input and output capacitors of each DC to DC power convertor circuits thereby extending their life.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
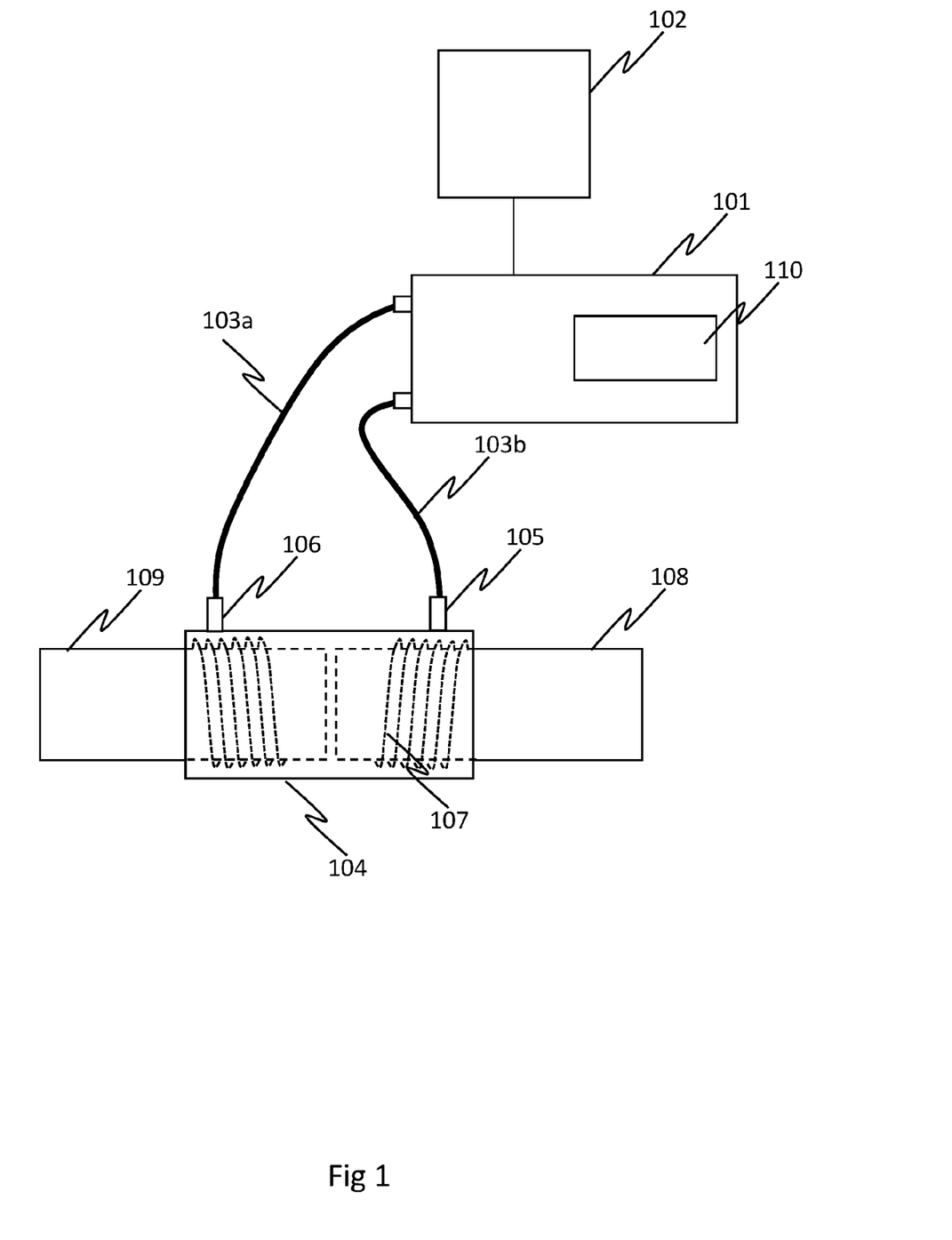
FIG. 1 provides a simplified schematic diagram of a battery powered electrofusion welding system.

FIG. 1 provides a schematic diagram of an electrofusion welding system powered by a battery using techniques in accordance with certain embodiments of the invention.

The system comprises a welding power delivery unit 101 which delivers current via conducting cables 103a, 103b (electrofusion welding cable means) to an electrofusion weld coupler 104. The welding power delivery unit 101 is powered by a battery 102. The battery 102 can be provided by any suitable battery provided by one or more battery cells and arranged in any suitable configuration. Examples include lithium-ion batteries. Typical characteristics of such a battery for powering an electrofusion welding system include an output voltage range of between 30V to 60V, maximum current draw of 100 A and total energy capacity 2 MJ.

The electrofusion weld coupler 104 includes two connectors 105, 106. Each connector 105, 106 is coupled to one of the conducting cables 103a, 103b. The connectors 105, 106 provide an electrical connection to a wire heating coil 107 which is embedded in the electrofusion weld coupler 104.

A first pipe section 108 and second pipe section 109 are fitted into the electrofusion weld coupler 104. The welding power delivery unit 101 generates a voltage across the connectors 105, 106 which generates a current that passes through the conducting cables 103a, 103b and through the wire heating coil 107 via the connectors 105, 106. This current, passing through the wire heating coil 107, heats the wire heating coil 107. The wire heating coil 107 is positioned within the electrofusion weld coupler 104 so that this heating causes regions of the electrofusion weld coupler 104 and adjacent regions of the first pipe section 108 and second pipe section 109 to melt. Once sufficient heating has occurred to give rise to the necessary amount of melting, the voltage is switched off and the melted regions of the first pipe section 108, second pipe section 109 and electrofusion weld coupler 104 cool, solidify and fuse together. When the melted regions have cooled completely, the solidified regions form a fluid-tight joint between the first pipe section 108, second pipe section 109 and electrofusion weld coupler 104.

For correct formation of the joint, the wire heating coil 107 must be heated in accordance with predetermined parameters. These parameters are typically the voltage that is to be applied across the wire heating coil 107 to and the length of time that wire heating coil 107 is subject to the heating. Deviations in either of these factors—e.g. not applying the correct voltage or not heating the wire coil for long enough, can result in the joint not properly forming. For this reason, the voltage applied across the wire heating coil 107, and thus the current delivered by the welding power delivery unit 101 must be accurately controlled. Control settings, allowing the welding parameters to be set, can be set by a user via a control panel 110. These control settings include the voltage to be applied, the length of time for which the voltage is applied and a time offset to take account of ambient temperature.

Figure 2:
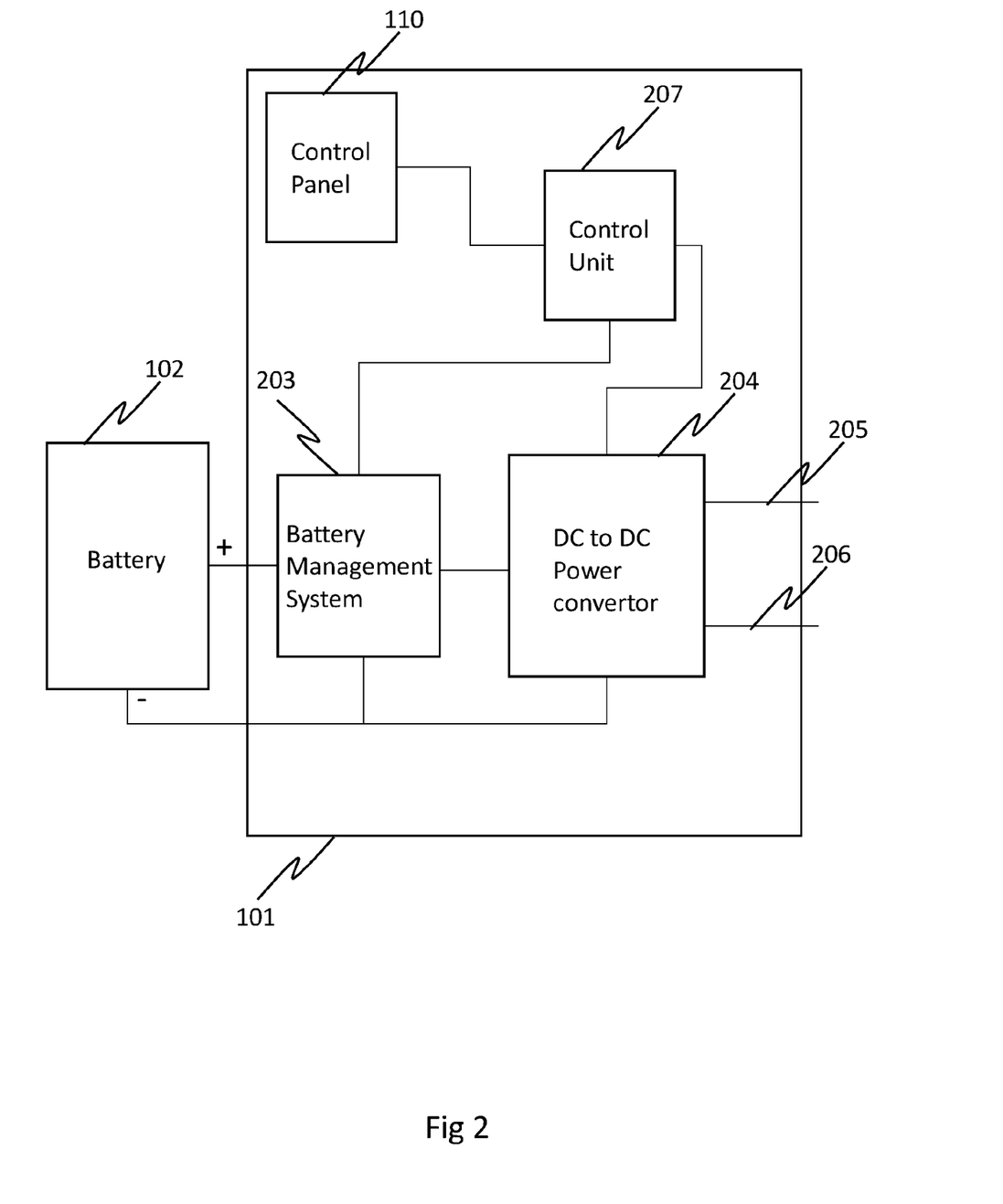
FIG. 2 provides a schematic diagram providing a more detailed view of aspects of the electrofusion welding system of FIG. 1.

FIG. 2 provides a schematic diagram providing a more detailed view of aspects of the electrofusion welding system described with reference to FIG. 1.

The welding power delivery unit 101 comprises a battery management system 203, a DC to DC power converter circuit arrangement 204 and a control unit 207.

A positive terminal of the battery 102 is connected directly to the battery management system 203. The battery management system 203 comprises power and control electronics that monitors the condition of the battery and prevents it from operating outside defined operating parameters (for example, preventing discharge below a level that will cause permanent damage to the battery).

A positive output line from the battery management system 203 is connected to the DC to DC power converter circuit arrangement 204. The DC to DC power convertor circuit arrangement 204 outputs electrical current on a positive conducting line 205 which is connectable to a first of the conducting cables 103a via an output terminal. A return conducting line 206, which is connectable to the other of the conducting cables 103b via another output terminal, is connected to a common ground, which is also connected to the negative terminal of the battery 102, battery management system 203 and DC to DC power convertor circuit arrangement 204.

The DC to DC power convertor circuit arrangement 204 is controlled by control logic provided by the control unit 207. The control unit 207 can be provided by any suitable processing device, for example a suitably configured microprocessor of the type well known in the art. The control unit 207 is also connected to the battery management system 203 and the control panel 110.

The control unit 207 controls the DC to DC power convertor circuit arrangement 204 to ensure that a voltage is applied across the conducting cables 103a, 103b that gives rise to the requisite current to perform a weld. The DC to DC power convertor circuit arrangement 204 is configured in particular to ensure consistent voltage output as the energy levels (and thus output voltage) of the battery 102 declines over time.

Figure 3:
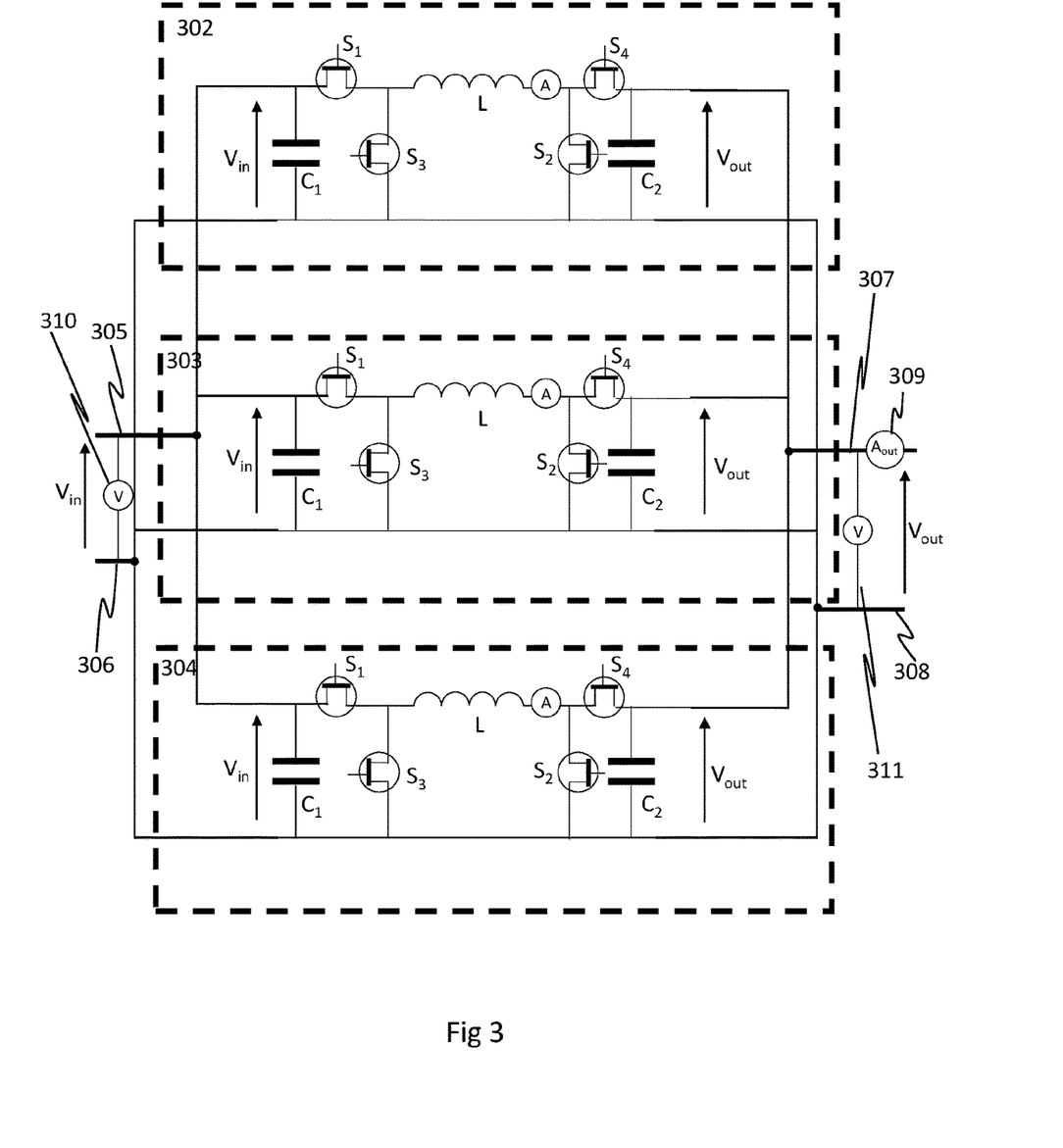
FIG. 3 provides a schematic diagram providing a view of a DC to DC power convertor circuit arrangement arranged in accordance with certain embodiments of the invention.

FIG. 3 provides a schematic diagram providing a more detailed view of the DC to DC power convertor circuit arrangement for use in a battery powered electrofusion welding system of the type described with reference to FIGS. 1 and 2.

The power convertor circuit arrangement comprises three "buck-boost" DC to DC power converters 302, 303, 304 which are arranged in a parallel multiphase, interleaved configuration. In other embodiments, a different number of DC to DC power converters can be provided, for example four, five, six, seven or eight, although in certain embodiments, a greater still number of DC to DC power converters can be used.

A buck-boost convertor is a DC to DC power convertor circuit configuration, known in the art, that includes a combination of a voltage "buck" (step-down) stage and a voltage "boost" (step-up) stage. In the example shown in FIG. 3, a "four-switch" topology is used to implement the buck-boost convertor. However, various other topologies, known in the art, can be used in examples of the invention, for example, Cuk topologies, dual active bridge topologies and resonant topologies.

Returning to FIG. 3, an input positive voltage line 305, which is connected to a positive terminal of the battery (via, for example, the battery management system 203 as described above), is connected to an input positive voltage line of each power converter 302, 303, 304.

A common ground connection 306 which is connected to a negative terminal of the battery is connected to a ground line of each power converter 302, 303, 304.

The input positive voltage line 305 (common input power line) and common ground connection 306 together form battery interface terminals (a first interface) of the power convertor circuit arrangement.

A positive output powerline of each power converter 302, 303, 304 is connected to a common output power line 307 which is connected to one of the output connectors which is configured to connect to one of the conducting cables.

An output ground line of each power converter 302, 303, 304 is connected to a common output ground line 308 which is connected to another output connector which is configured to connect to the other of the conducting cables.

The common output power line 307 and the common output ground line 308 together form welding interface terminals (a second interface) of the power convertor circuit arrangement.

Each power converter 302, 303, 304 is arranged in a "four-switch" buck-boost configuration. In this configuration, each power converter comprises two capacitors C1, C2, an inductor L and four switches S1, S2, S3 and S4 and a current detector A. The inductor is typically provided by a suitable inductor, for example a flat wound, high frequency ferrite, 10 uH inductor, and the first and second capacitors are provided by suitable capacitors, for example each provided by a 47 uF capacitor.

The switches S1, S2, S3 and S4 are typically provided by suitable switching transistors such as high speed low resistance field effect transistors (FETs) such as metal-oxide-semiconductor field-effect transistors (MOSFETs).

The input voltage Vin, provided by the battery, is expressed across the first capacitor C1. A first pair of the switches, S1, S3, are arranged in series with each other, and are together arranged in parallel with the first capacitor C1. A second pair of the switches S2 and S4 are arranged in series with each other and together are arranged in parallel with the second capacitor C2 across which the output voltage Vout is expressed. The inductor L is connected between the midpoint of the first pair of switches S1, S3 and the second pair of switches S4, S2. The current detector A is connected in series with the inductor to monitor the current passing through the inductor L.

The circuit arrangement includes a further current detector 309, which measures the total current being delivered to the conducting cables, and a first voltage detector 310 that measures the input voltage at the input of the power convertor circuit arrangement and a second voltage detector 311 that measures the output voltage at the output of the circuit arrangement and thus monitors the voltage across the conducting cables (and thus the voltage applied across the wire heating coil).

Although not shown for clarity, each switch, each current detector A, the further current detector 309 and the first and second voltage detectors 310, 311 are connected to the control unit via a signal line. The signal lines connecting the switches to the control unit are the means by which the control unit switches the switches on and off. The signal lines connected to the current detector A in each power convertor 302, 303, 304, the further current detector 309 and the first and second voltage detectors 310, 311 to the control unit enable the control unit to monitor the operation of the circuit arrangement, specifically, the current produced by each power convertor 302, 303, 304, the total current produced by the circuit arrangement, and the input voltage provided by the battery and the output voltage provided by the circuit arrangement.

Although in the embodiment shown in FIG. 2, a single control unit 207 is provided, in certain embodiments, more than one control unit may be provided. For example, separate, connected, control units may be provided for each individual power convertor 302, 303, 304.

The arrangement of the power converters 302, 303, 304 means that, depending on the switching pattern controlled by the control logic provided by the control unit, the power convertors can operate in "buck mode", where the voltage input ($V_{in}$) to the circuit arrangement is greater than the voltage output ($V_{out}$), and in "boost mode", where the voltage input ($V_{in}$) to the circuit arrangement is lower that the voltage output ($V_{out}$).

Figure 4A:
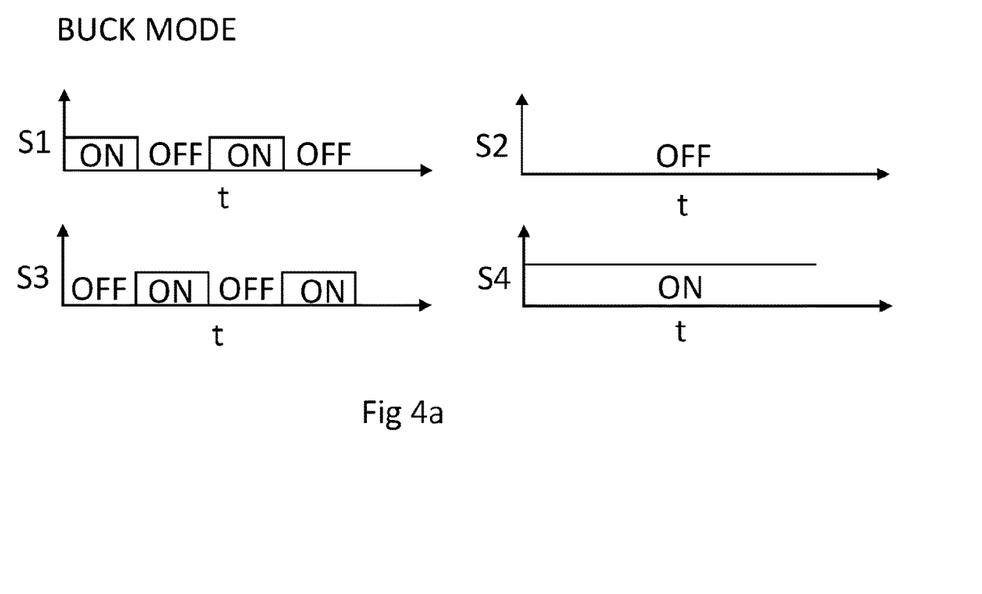
FIGS. 4a, 4b, 5a and 5b provide diagrams depicting buck and boost switching patterns for DC to DC power convertors in accordance with certain embodiments of the invention, and FIGS. 6 and 7 provide schematic diagrams of an example of a power convertor circuit arrangement in accordance with certain embodiments of the invention.

FIG. 4a provides a diagram depicting the switching configuration of the switches of each DC to DC power convertor, as controlled by the control unit, when in buck mode. Switch S2 is permanently off and switch S4 is permanently on. Switch S1 and S3 are switched on and off alternately. The duty cycle of the switching of S1 and S3 determines the output voltage $V_{out}$.

Figure 4B:
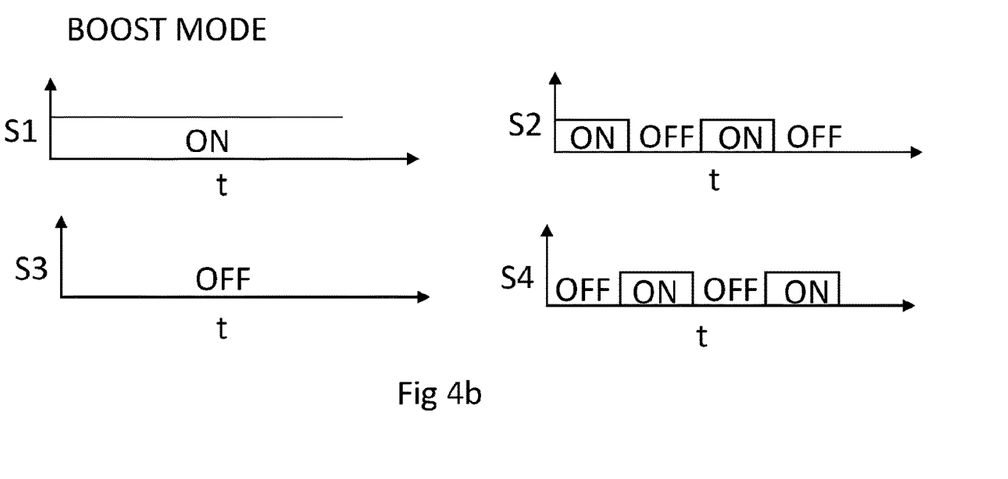

FIG. 4b provides a diagram depicting the switching configuration of the switches of each DC to DC power convertor, as controlled by the control unit, when in boost mode. Switch S3 is permanently off and switch S1 is permanently on. Switch S2 and S4 are switched on and off alternately. The duty cycle of the switching of S1 and S4 determines the output voltage $V_{out}$.

In this way, as the voltage of the battery drops as the energy in the battery diminishes, at an appropriate time, the control unit can control the power convertors to switch from buck mode to boost mode.

For example, the control unit may be configured to control the power convertor circuit arrangement to generate an output voltage between 8V and 48V. The battery may be provided by a lithium ion battery unit which has voltage output that varies from approximately 52V at full charge to 42V at 15% charge.

In the event that the control unit was set so that the power convertor circuit arrangement was to deliver the maximum 48V output, the switches of the power convertors would be controlled by the control unit to operate in buck mode. As the battery depleted and the battery voltage dropped below 48V, the switches of the power convertors would be controlled by the control unit to operate in boost mode.

In the event that the control unit was set so that the power convertor circuit arrangement was to deliver an output of 39.5V (a common output voltage used in electrofusion welding), the switches of the power convertors would be controlled by the control unit to operate in buck mode.

In certain embodiments, the control unit is configured to selectively shut down one or more of the DC to DC power converters 302, 303, 304, for example if a particular weld had a lower current requirement to perform the weld. This saves power as the switching losses associated with switching of the switches of whichever of the DC to DC power converters is shut down is not incurred. The control unit can shut down one of the DC to DC power converters by, for example, not energising (thereby holding open) all its switches.

Advantageously, due to the configuration of the power convertor circuit arrangement, it can be controlled by the control unit to perform a battery charge function. In this configuration, operation of the power convertor circuit arrangement reverses and an input voltage is applied at the welding terminals of the power convertor circuit arrangement which, under the control of the control unit switching the switches, gives rise to an output voltage at the battery interface terminals which charges the battery.

When undertaking this battery charge function, the conducting cables, or other suitable connectors connected to the common output power line 307 and output ground line 308, can be connected to a suitable power source. Conveniently, a power source, such as 12V auxiliary power source fitted to most vehicles, can be used.

To charge the battery, the control unit is configured to control the voltage at the battery interface terminals to generate a charging voltage/current (charging power) in accordance with a required charging profile of the battery. For a lithium ion battery, a common charging profile is "constant voltage/constant current". In this profile, the control unit controls a constant current to be delivered to the battery until a predetermined voltage level is detected across the battery. Once this predetermined voltage level is reached, the control unit then maintains this constant voltage at the battery interface terminals until the charging cycle is complete. The control unit can configure the power convertor circuit in buck mode and boost mode to meet these requirements.

In the charging mode the function of the switches is reversed. This is depicted in FIGS. 5a and 5b.

Figure 5A:
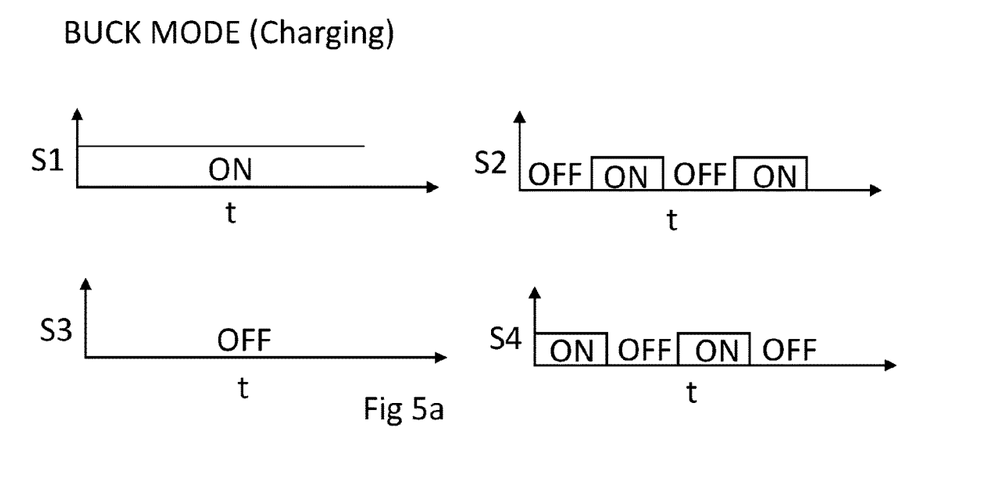

As shown in FIG. 5a, when in buck mode, switch S3 is permanently off and switch S1 is permanently on. Switch S4 and S2 are switched on and off alternately. The duty cycle of the switching of S4 and S2 determines the output voltage Vout (across the battery interface terminals) which is less than Vin (across the welding terminals).

Figure 5B:
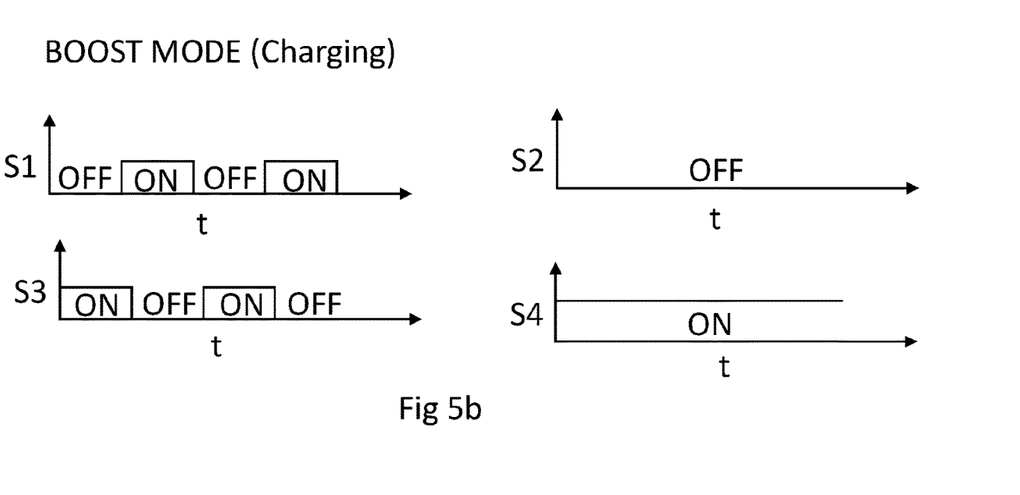

FIG. 5b provides a diagram depicting the switching configuration of the switches of each DC to DC power convertor, as controlled by the control unit, when in boost mode. Switch S2 is permanently off and switch S4 is permanently on. Switch S1 and S3 are switched on and off alternately. The duty cycle of the switching of S1 and S3 determines the output voltage Vout (across the battery interface terminals) which is greater than Vin (across the welding terminals).

In the power convertor circuit arrangement described with reference to FIG. 3, three DC to DC power convertors are arranged in parallel and are each connected to the same pair of output connectors for connecting to the same pair of conducting cables.

However, in other embodiments, a power convertor circuit arrangement is provided that corresponds to that described with reference to FIG. 3, except that a switching unit is provided which enables one or more of the DC to DC power convertors to power a further pair of conducting cables.

Figure 6:
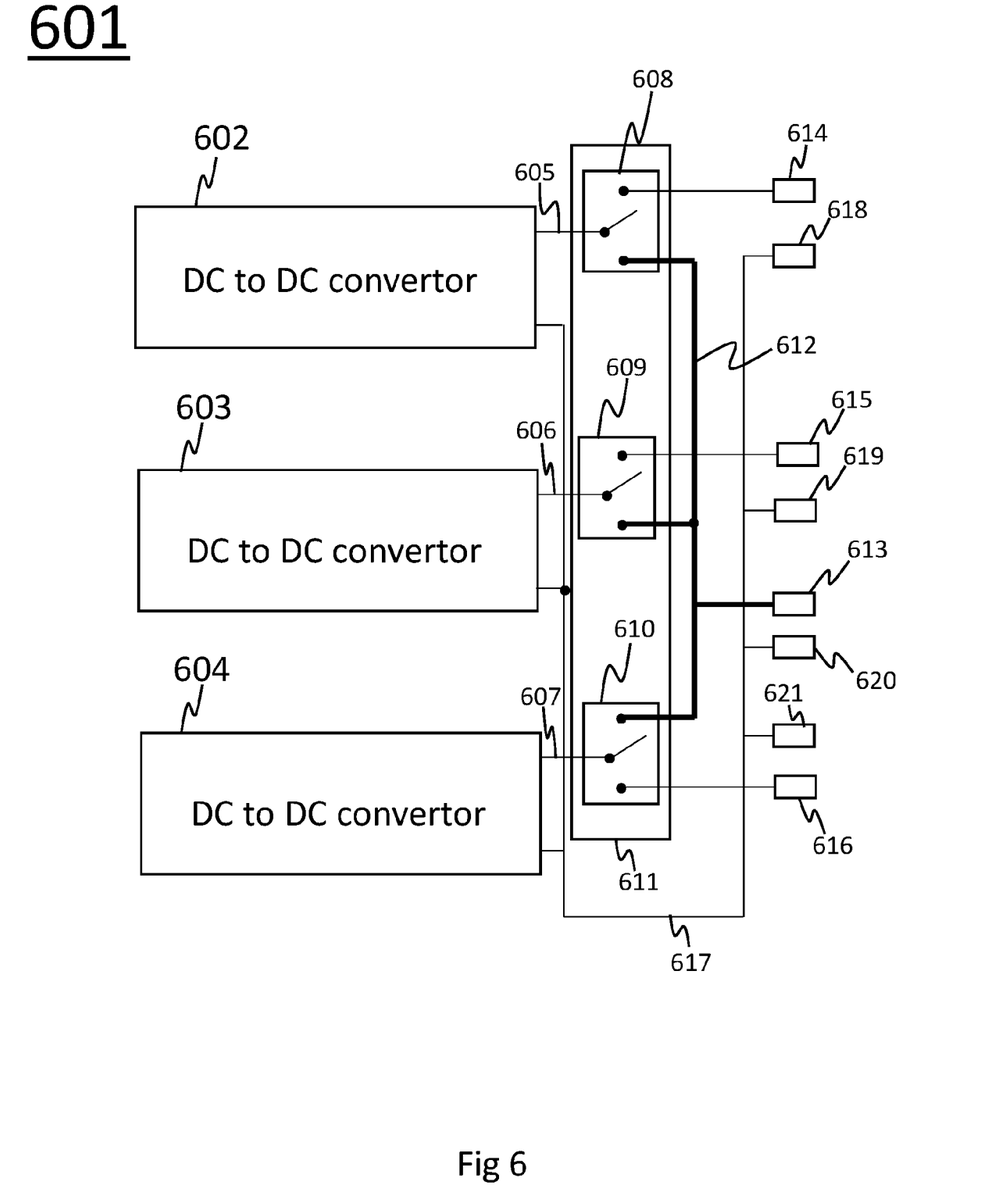

FIG. 6 provides a schematic diagram of an example of such an embodiment. In keeping with the power convertor circuit arrangement described with reference to FIG. 3, a power convertor circuit arrangement 601 includes three DC to DC power convertors 602, 603, 604 (for clarity the internal components of the DC to DC power convertors are omitted).

The output power lines 605, 606, 607 of each DC to DC convertor 602, 603, 604 are connected to a switch 608, 609, 610 in a switching unit 611 which is connected to the control unit via signal line and via which the control unit can control the switches 608, 609, 610.

Each switch 608, 609, 610 is configured so that in a first switching position the output power line 605, 606, 607 of the DC to DC convertor to which it is connected, is connected to a common output power line 612 to which the other DC to DC convertors can also be connected via their corresponding switch. The common output power line 612 is connected to a common output connector 613.

Each switch 608, 609, 610 is further configured so that in a second switching position the output power line 605, 606, 607 of the DC to DC convertor to which it is connected, connect to a separate output power line which is connected to a separate output connector 614, 615, 616.

The output ground line of each convertor is connected to a common output ground line 617 which is connected to a set of output ground connectors 618, 619, 620, 621.

In this way, the power convertor circuit arrangement can be arranged to power more than one set of conducting cables, enabling electrofusion welding to be performed simultaneously, or concurrently on different joints and, if required, at different voltages.

Figure 7:
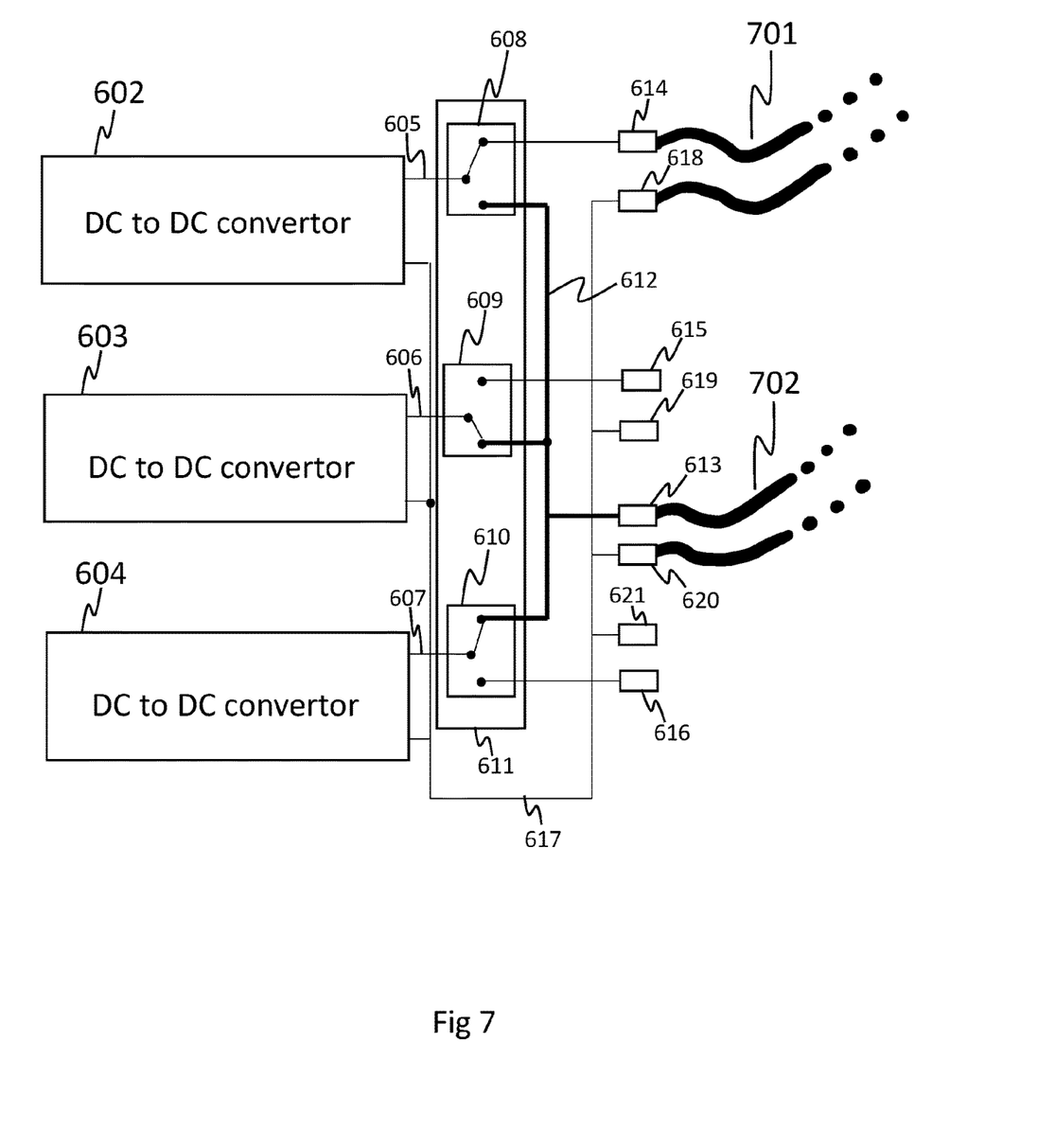

An example of the operation of the power convertor circuit arrangement described with reference to FIG. 6 is shown in FIG. 7.

As can be seen, in this configuration the switch 608 connected to the first DC to DC convertor 602 is in the second switching position, thereby connecting the output power line 605 of the first DC to DC convertor 602 to its separate output connector 614 enabling a first pair of conducting cables 701 to be powered from the first DC to DC convertor 602 alone.

However, the switches 609, 610 connected to the second and third DC to DC convertors respectively are in the first switching position thereby connecting the output power lines 606, 607 of the second and third DC to DC convertors 603, 604 to the common output connector 613. In this way, a second pair of conducting cables 702 can be powered by the second and third DC to DC convertors 603, 604.

It will be understood that power convertor circuit arrangements (for example of the type described with reference to FIG. 3) arranged in accordance with embodiments of the invention can be used in applications other than electrofusion welding. Specifically, power convertor circuit arrangements in accordance with embodiments of the invention can be used in any application requiring a consistent and controlled output voltage from a battery, that cannot be relied on to provide a consistent output voltage over time.

Examples include (but are not restricted to) battery powered domestic appliances such as battery powered vacuum cleaners, battery powered lawn mowers and battery powered pressure washers.

Further examples include battery powered tools such as battery powered arc-welders.

Further examples include battery-powered emergency power supplies, such as a boost charger and starter for a vehicle such as a car. Further examples include battery powered power supplies for charging electronic devices such as a mobile phones or for power lighting systems.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A power convertor configured to output power to an electrofusion welding coupler for performing electrofusion welding, said power convertor comprising an array of connected DC to DC power convertor circuits, said array of connected DC to DC power convertor circuits configured to receive, at a first interface, power at a first voltage level from a battery and output power, at a second interface, at a second voltage level to provide power to electrofusion welding cable means, wherein
    said DC to DC power convertor circuits are arranged in a buck-boost configuration which can operate in a boost mode in which the first voltage level is less than the second voltage level and in a buck mode in which the first voltage level is greater than the second voltage level, wherein each DC to DC power convertor circuit comprises a plurality of switches, the plurality of switches of each DC to DC power convertor circuit configurable to operate in accordance with a first switching sequence which configures the DC to DC power convertor circuit, which the plurality of switches comprise, to operate in the buck mode and configurable to operate in accordance with a second switching sequence which configures the DC to DC power convertor circuit, which the plurality of switches comprise, to operate in the boost mode, wherein the power convertor further comprises control logic, wherein the plurality of switches of the DC to DC power convertor circuits are controlled by the control logic, wherein the control logic is operable to selectively switch-off one or more of the DC to DC power convertor circuits during welds with lower current requirements.

2. The power convertor according to claim 1, wherein the DC to DC power convertor circuits are connected in parallel.

3. The power convertor according to claim 2, wherein the DC to DC power convertor circuits are connected to a common ground, a common input power line and a common output power line.

4. The power convertor according to claim 1, wherein the control logic is operable to control the plurality of switches of the DC to DC power convertor circuits to implement a battery charge function in which input charging power is received from the second interface at an input voltage level and output charging power is output for charging the battery at the first interface at an output level.

5. The power convertor according to claim 1, wherein the DC to DC power convertor circuits are configured in a four-switch configuration.

6. The power convertor according to claim 5, wherein each DC to DC power convertor circuit comprises an inductor and four switches, a first pair of the switches connected in series and configured such that, in use, across the first pair of the switches, an input voltage at the first voltage level from the battery is expressed, and a second pair of the switches connected in series and configured such that in use, an output voltage, at the second voltage level, for applying across the electrofusion welding cable means is expressed, wherein an inductor connects the first pair of the switches and the second pair of the switches at a mid-point between the switches of each pair of the switches.

7. The power convertor circuit according to claim 6, wherein control logic controls the switches to:
    operate in a buck mode by switching the switches of the first pair of the switches on and off alternately in accordance with a duty cycle, and switching a first switch of the second pair of the switches continuously off and switching a second switch of the second pair of the switches continuously on, wherein the switch that is continuously on is the switch of the second pair of the switches connected to ground, and
    operate in a boost mode by switching the switches of the second pair of the switches on and off alternately in accordance with a duty cycle, and switching a first switch of the first pair of the switches continuously off and switching a second switch of the first pair of the switches continuously on, wherein the switch that is continuously on is the switch of the first pair of the switches connected to ground.

8. The power convertor circuit according to claim 7, wherein the switches comprise field effect transistors.

9. The power convertor according to claim 1, wherein one or more of the DC to DC power convertors of the array of connected DC to DC power convertor circuits are configured to selectively provide output power, at a further interface, at a further voltage level to provide power to further apparatus requiring electrical power.

10. The power convertor circuit according to claim 1, wherein the array of connected DC to DC power convertor circuits comprises at least three DC to DC power convertor circuits.

11. An electrofusion welding power supply comprising:
    a battery; and
    a power convertor configured to output power to an electrofusion welding coupler for performing electrofusion welding, said power convertor comprising an array of connected DC to DC power convertor circuits, said array of connected DC to DC power convertor circuits configured to receive, at a first interface, power at a first voltage level from the battery and output power, at a second interface, at a second voltage level to provide power to electrofusion welding cable means, wherein
    said DC to DC power convertor circuits are arranged in a buck-boost configuration which can operate in a boost mode in which the first voltage level is less than the second voltage level and in a buck mode in which the first voltage level is greater than the second voltage level, wherein each DC to DC power convertor circuit comprises a plurality of switches, the plurality of switches of each DC to DC power convertor circuit configurable to operate in accordance with a first switching sequence which configures the DC to DC power convertor circuit, which the plurality of switches comprise, to operate in the buck mode and configurable to operate in accordance with a second switching sequence which configures the DC to DC power convertor circuit, which the plurality of switches comprise, to operate in the boost mode, wherein the power convertor further comprises control logic, wherein the plurality of switches of the DC to DC power convertor circuits are controlled by the control logic, wherein the control logic is operable to selectively switch-off one or more of the DC to DC power convertor circuits during welds with lower current requirements.

12. The electrofusion welding power supply according to claim 11 configured to provide power for an electrofusion welding system, said power supply comprising output connections for electrofusion cable means connected to the second interface.

* * * * *